Patented Sept. 11, 1945

2,384,467

UNITED STATES PATENT OFFICE 2,384,467

PICKLING INHIBITORS

William H. Hill, Mount Lebanon, Pa., assignor to American Cyanamid Company, New York, N. Y., a corporation of Maine No Drawing. Application December 11, 1940, Serial No. 369,562

4 Claims. (Cl. 252—148)

This invention relates to the preparation of pickling inhibitors. More particularly, the invention relates to the preparation and use of aldehyde condensation products of the sulfides of amidines and polyamines as pickling inhibitors.

Such substances inhibit the solvent action of pickling acids on metals but still permit the acid to clean and remove scale, rust, oxides and the like from the metal surface. In the past, a number of compounds have been used as inhibitors in acid cleaning and pickling baths, however, such preparations have not been very satisfactory when used as inhibitors. For example, some of these products though found to have satisfactory inhibiting effect are very difficultly soluble in acids. In order to use them they have to be boiled in the concentrated acid before dilution with water to normal pickling strength; others are readily volatilized and hence lose their effectiveness, especially when used in a heated pickling bath; still others must be used in large proportions and are therefore neither economical nor efficient.

It is the principal object of this invention to prepare a pickling inhibitor which is effective in extremely dilute proportions. A further object is to provide an inhibitor which is cheap and easy to make. A still further object is to prepare an acid soluble inhibitor. Other and further objects and advantages will become apparent in the description of the invention, particularly as given in the illustrative examples.

It has been found that the reaction products of the amidine sulfides with aldehydes as well as the reaction products of the polyamine sulfides with aldehydes are efficient inhibitors for acid pickling and cleaning solutions. These products are readily soluble in various pickling baths in the required amounts necessary for effective operation. Only a very small amount, usually a fraction of one percent, of any inhibitor composition of this invention is sufficient.

The products of this invention are prepared by making an aqueous or an alcoholic solution or slurry of the particular amidine or polyamine, passing hydrogen sulfide into the mixture until reaction ceases, filtering the solution where necessary and condensing the filtrate with an aldehyde, such as formaldehyde in aqueous solution. The condensation product is then dissolved in a diluted acid solution where it permits the acid of the pickling bath to attack the unclean or oxidized portions of the metal surface while protecting the clean portions from corrosive or further acid attack.

Thus, iron and steel articles coated with scale and dirt can be effectively cleaned while preventing substantial loss of the metal by its reaction with the pickling acid to liberate hydrogen. The advantage of an effective inhibitor is twofold: it allows the acid to dissolve the iron oxide, scale, etc., but it substantially prevents the pickling acid from attacking the metal surface itself. Dissolution of metal in a pickling bath is undesirable because this weakens the acid bath and in addition causes a pitting and roughening of the surface. This is undesirable if a smooth surface for subsequent painting or metal coating is desired.

In order that this invention may be more fully and clearly understood, the following examples are given:

Example I 4100 cc. of an isopropanol solution of guanidine containing approximately 6.2 mols. of guanidine was saturated with hydrogen sulfide. 1300 cc. (17.5 mols.) of a 40% formaldehyde solution was then added. An exothermic reaction resulted and a white sticky solid separated out slowly. The mixture was diluted with 8 liters of water and allowed to stand several hours, whereupon the supernatant liquid was decanted, the solid material which had become brittle was ground, filtered and dried to yield 553 g. of the desired product, a white guanidine sulfine resin.

A pickling solution was prepared using 250 cc. of concentrated hydrochloric acid diluted with 250 cc. of water. One half of one gram of the guanidine sulfine resin was dissolved in the diluted acid. Two rusty carpet tacks were submersed and the rust was quickly dissolved off leaving the clean metal exposed. There was no evolution of hydrogen. When a pickling solution having no inhibitor was used, and two rusty tacks added, the rust was removed but a copious evolution of hydrogen took place.

Example II 150 g. of diphenylguanidine was suspended in water and the aqueous slurry saturated with hydrogen sulfide. After the reaction proceeded for a short interval of time, the solution became clear, whereupon it was filtered. A 40% aqueous solution of formaldehyde was added in excess to the filtrate. A white suspension formed and the mixture was heated on a water bath to melt the suspended resin which flowed together and collected on the bottom of the container in the form of a light yellow, transparent mass. The supernatant solution was decanted off and the resin washed with water to remove any excess formaldehyde.

This resin was only very slightly soluble in dilute acids. Hence only one tenth of one gram was added to a pickling solution comprising 250 cc. of concentrated hydrochloric acid diluted with 250 cc. of water. Two nails were submerged in this solution and although a small amount of hydrogen was evolved, it was apparent that the resin was a definite inhibitor. After one or two days the nails were still bright and showed no pitting. After 10 days the nails showed some signs of acid attack.

*Example III*

50 cc. of diethylenetriamine were diluted with 50 cc. of water and the solution saturated with hydrogen sulfide. A 40% aqueous solution of formaldehyde was added solwly and as long as a white, fibrous, precipitate formed. The precipitate, upon standing, became spongy and rubberlike and after being separated out, washed with water, dried at 105° C. yielded a light yellow, sticky, very viscous resin which darkened when heated to 145° C.

A pickling solution was prepared using 250 cc. of concentrated hydrochloric acid diluted with 500 cc. of water. Two tenths of one gram of the above diethylene-triamine sulfine resin was added and dissolved very easily in the diluted acid. Two blued (oxidized) nails were added and after approximately ½ to 1 hour were bright. Even after 3 days in the solution the nails were bright and smooth and did not seem to show any material attack by the acid. After 7 days one nail still seemed unattacked while the other showed a very narrow slit at the tip, but both nails still remained bright and smooth.

*Example IV*

In a manner similar to that above described in Example III a sulfine resin was prepared from 100 cc. of triethylene-tetramine diluted with 175 cc. of water, the solution being saturated subsequently with hydrogen sulfide. After condensing the product with formaldehyde as above and extracting, a light yellow, but more viscous resin was obtained than that in Example III. This resin also darkened when heated to 145° C.

When dissolved in a pickling solution similar to that given in the above example, (one tenth of one percent) this triethylene-tetramine sulfine resin also acted as an inhibitor and compared very favorably with the previous sulfine resin inhibitor. Only after 17 days submersion, could the more effective inhibition of the diethylenetriamine sulfine resin be noted. Then the nails from Example III looked better, one being almost unattacked, the other nail having a slit in its tip, while the nails from Example IV showed more corrosion.

*Example V*

150 g. of melamine was suspended in water and the aqueous slurry saturated with hydrogen sulfide. When a 40% aqueous solution of formaldehyde was added in excess, the melamine reaction mixture dissolved and after several hours a grey resin precipitated out, which was filtered and washed with water.

A pickling solution was prepared using 250 cc. of concentrated hydrochloric acid diluted with 500 cc. of water. Three tenths of one gram of the above melamine sulfine resin were dissolved therein. Two nails were added and showed very little hydrogen to be evolved. A control solution containing two nails in a similar pickling acid except that melamine instead of the sulfine resin was added showed that the melamine was not as good an inhibitor, for, after three days the nails in the control solution were black and split at the tips and after 4 days these same nails were black and badly corroded whereas the sulfine resin protected nails were still bright after 4 days submersion.

In order to demonstrate the effectiveness as inhibitors of the polyamine sulfine resins having 3 or more amine groups as contrasted with those having less than 3 amine groups, a number of these resins were prepared as in the following examples and comparative tests were conducted.

*Example VI*

50 cc. of a 22% aqueous solution of monomethylamine was saturated with hydrogen sulfide. This mixture was reacted with an excess of formalin to yield a gray-white precipitate which was filtered, washed with water, and dried. The product was a monomethylamine sulfine resin.

*Example VII*

50 cc. of triethylamine were mixed with 50 cc. of water and the mixture saturated with hydrogen sulfide. The reaction mixture gradually formed a relatively clear solution whereupon an excess of formalin was added and reaction occurred with the liberation of a little heat, the product forming as a thick oil layer on the surface. Reacting this further on a steam bath resulted in a white precipitate which was filtered off, washed and dried. The product was a triethylamine sulfine resin.

*Example VIII*

50 cc. of diethanolamine were mixed with 50 cc. of water and the mixture saturated with hydrogen sulfide. Adding formalin gave, at first, a slight color change but heating the reaction mixture on a steam bath resulted in the formation of a white solid precipitate, which was filtered off, washed and dried. The product was a diethanolamine sulfine resin.

*Example IX*

50 cc. of triethanolamine were diluted with 50 cc. of water and the mixture saturated with hydrogen sulfide. This solution was reacted with an excess of formalin on a steam bath whereupon the solution became cloudy and a gray-white somewhat gelatinous precipitate formed which was filtered, washed with water and dried. The product was a triethanolamine sulfine resin.

A series of pickling solutions were prepared each containing 250 cc. of concentrated hydrochloric acid diluted with 500 cc. of water. Then one half of one gram of the inhibitors prepared according to Examples VI to IX and I were added and two blue nails submerged in each. The results of these tests is given in the following table:

|   | Agent | 4 days exposure | 8 days exposure |
|---|---|---|---|
| 1 | VI | Fair, nails black | Both nails badly corroded. |
| 2 | VII | Good, 1 nail black, 1 nail bright. | 1 nail good, 1 nail corroded badly. |
| 3 | VIII | Nails dissolved | |
| 4 | IX | Not as good as No. 1 | 1 nail dissolved, 1 nail badly corroded. |
| 5 | None | Nails dissolved | |
| 6 | I | Excellent, nails bright, tips blackened. | Both nails in good condition, tips show partial dissolution. |

The inhibitors in tests 1 to 4 did not dissolve very readily, but a sufficient amount of each went into solution. The guanidine sulfine resin of test 6 dissolved easily and this inhibitor was the only one that showed practically no immediate attack upon the bright metal surface.

The compounds produced as above described are very effective acid inhibitors and require the addition of only very small amounts to a pickling bath in order to inhibit the solvent action of the acid in the bath on metal. In order to show the superiority of the products of this invention over the standard inhibitors of the trade, a commonly incorporated commercial inhibitor was used in one set of tests and the above guanidine sulfine resin in another set of tests. The efficiency of the products was determined in the following manner:

The inhibiting efficiency was determined by weighing small strips of scale-free steel, S. A. E. 1010, 26 gauge and size 3'' x 4'', comparing the loss in weight sustained in inhibited 5% sulfuric acid at 180% F.±2° with the loss in weight sustained by similar pieces of steel in 5% sulfuric acid containing no inhibitor. Various strengths of inhibitor were used.

The inhibiting efficiency was then calculated from the following expression:

$$100 - \left(100 \times \frac{\text{loss in grams of inhibited bath specimen}}{\text{loss in grams of blank bath specimen}}\right)$$

The results are given in the following table:

| Commercial inhibitor | Inhibitor strength, percent | Inhibiting efficiency | | |
|---|---|---|---|---|
| | | First 30 minutes | Next 60 minutes | Next 60 minutes |
| | 0.00625 | 87 | 93 | 92 |
| | 0.01250 | 92 | 96 | 96 |
| | 0.02500 | 95 | 97 | 98 |
| Guanidine sulfine resin | 0.00625 | 92 | 97 | 98 |
| | 0.01250 | 93 | 97 | 98 |
| | 0.02500 | 95 | 98 | 98 |

From these tests it will be seen that the acid inhibitors of this invention surpass, in efficiency, the usual run of inhibitor now used commercially.

In addition to guanidine sulfides, various other amidine sulfides can be prepared and used in order to obtain an aldehyde condensation product having valuable inhibitor properties. Thus guanyl urea, biguanid and the alkyl, aryl and aralkyl substitution products thereof can be reacted with hydrogen sulfide and subsequently condensed with various aldehydes.

Similarly, any guanidine base of the above group may be reacted with hydrogen sulfide, such as guanidine itself, dimethyl or trimethyl guanidine; dibutyl guanidine, mono-, di-, or triphenyl guanidine; ditolyl guanidine, or hydroxyalkyl substituted guanidines such as mono-, di-, or triethanol guanidine and the like. Likewise such guanylurea compounds as guanylurea itself, mono- or di-methyl guanylurea, diphenyl guanylurea, tetra-ethyl guanylurea, and triethanol guanylurea are organic bases which form useful sulfine resins with hydrogen sulfide.

Biguanid, and such substituted biguanids as mono- and dimethyl and diethyl biguanids, diamyl biguanids, 1.5-diallyl biguanid, 1.1.5.5-tetramethyl biguanid, 1.1.2-trimethyl biguanid, and 1.2.3-triphenyl biguanid will also form useful sulfine resins of the present invention.

In a similar manner, various other sulfine resins and inhibited acid pickling solutions can be prepared. Thus, ethylene diamine, monobutyl amine, and cyclohexylamine sulfine resins among various others may be prepared, although the more active resinous inhibitors have been more specifically described above in the examples. Also, various modifications of the process are possible, as for example a formaldehyde solution may be reacted with hydrogen sulfide and an amine then reacted with the product.

Although, in the examples given, formaldehyde has been specifically mentioned, any other aldehyde may be used such as paraformaldehyde, crotonaldehyde, acetaldehyde, among numerous others. Also, various other acids such as sulfuric, formic, citric, tartaric, acetic, lactic, phosphoric, and hydrofluoric may be used with these inhibitors.

In the preparation of the metal surface for the pickling bath, it is preferable to first free the metal from grease by dipping in an organic solvent or an alkali or by the addition of a wetting agent. In the examples, the concentration of the acid or the temperature of the solution may be varied as desired. The proportions of the inhibitors used may vary likewise, relatively large proportions may at times be necessary to reduce the corrosion of the metal to a minimum. In general, a quantity of between one tenth of a gram and one gram per 100 grams of actual acid content will be found sufficient, one half of a gram being usually preferred.

It is to be noted that the products of this invention readily attack oxides and scale with a minimum loss of free metal. In every instance, the primary purpose of a pickling bath is the removal of undesirable deposits and incrustations. In particular, ferrous metals pickled with the products of this invention are cleaned and magnetic blue oxides, phosphates, etc., removed, and the metals acquire a superior finish, with pitting almost completely eliminated. Moreover, the amount of metal and acid consumed is unusually small.

Since many modifications may be made in the foregoing examples, it is to be understood that still other embodiments differing in scope from the above examples can be readily made without exceeding the bounds of this invention which is to be limited only by the scope of the appended claims.

I claim:

1. An inhibitor composition for pickling ferrous metals comprising a non-oxidizing acid pickling solution and a condensation product of formaldehyde wth the reaction product of hydrogen sulfide and a guanidine.

2. The process of cleaning and pickling metals which comprises subjecting the metals to the action of a non-oxidizing acid which contains a condensation product of formaldehyde with the reaction product of hydrogen sulfide and a guanidine.

3. A pickling bath for iron and steel articles comprising a non-oxidizing mineral acid and a .006 to .025% solution of a condensation product of formaldehyde with the reaction product of hydrogen sulfide and a guanidine.

4. A pickling inhibitor for ferrous metals comprising a condensation product of formaldehyde with the reaction product of hydrogen sulfide and a guanidine

WILLIAM H. HILL.